Apr. 3, 1923.
S. W. SNYDER
DRAWBAR FOR TOWING VEHICLES
Filed June 13, 1921
1,450,759
2 sheets-sheet 1
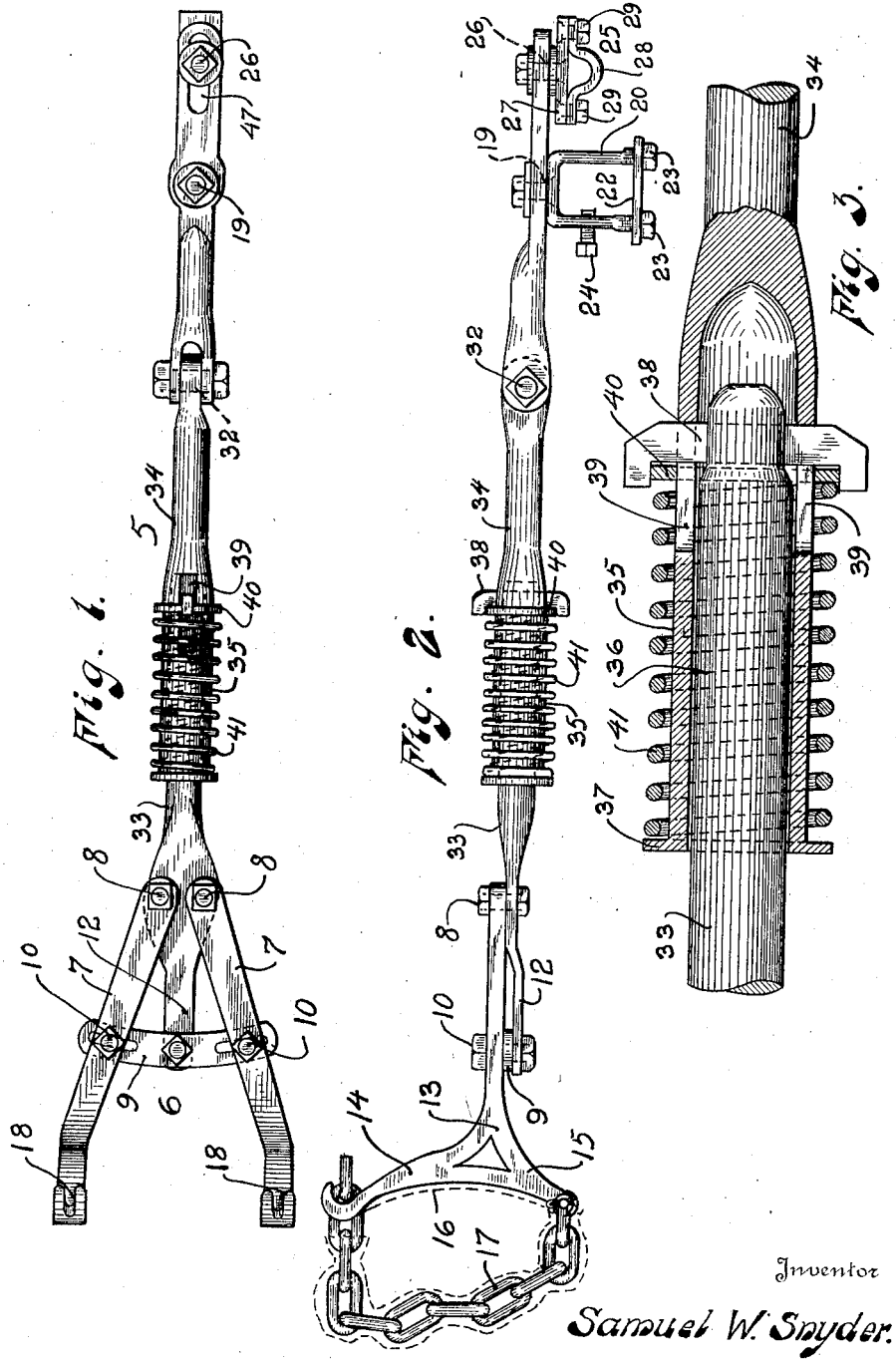
Inventor
Samuel W. Snyder.
Attorney Patented Apr. 3, 1923.

1,450,759

UNITED STATES PATENT OFFICE.

SAMUEL W. SNYDER, OF HAMLET, NEBRASKA, ASSIGNOR OF ONE-THIRD TO JOHN H. WABLE AND ONE-THIRD TO WILLIAM HUMMELL, BOTH OF HAMLET, NEBRASKA.

DRAWBAR FOR TOWING VEHICLES.

Application filed June 13, 1921. Serial No. 477,048.

*To all whom it may concern:*

Be it known that I, SAMUEL W. SNYDER, a citizen of the United States, residing at Hamlet, county of Hayes, and State of Nebraska, have invented certain new and useful Improvements in Drawbars for Towing Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in draw bars for towing automobiles, my object being to provide a device of this class which shall be exceedingly efficient for the purpose intended and of simple and economical construction.

The device consists of a forwardly located hound shaped member whose arms are adapted to engage the housing of the towing machine, on opposite sides of the differential while the rear portion of the device is adapted to be connected with the front axle of the machine to be towed and also with the tie bar or rod which connects the cranks of the pivoted journals of the front wheels so that the machine to be towed will be steered to harmonize with the steering of the towing machine, the draw bar being pivoted or fulcrumed on a U-shaped bolt which connects the bar with the front axle of the machine to be towed, hence, as the direction of the towing machine is changed by the manipulation of the steering wheel, the draw bar is moved on its said pivotal fulcrum and the front wheels of the towed machine are also shifted for steering purposes.

Having briefly outlined my improvement I will proceed to describe the same in detail reference being made to the accompanying drawing in which is illustrated an embodiment thereof.

In this drawing:

Fig. 1 is a top plan view of my improved towing draw bar shown in detail.

Fig. 2 is a side elevation of the same.

Fig. 3 is a section taken through a part of the draw bar the parts being shown on a larger scale.

The same reference characters indicate the same parts in all the views.

Figure 4:
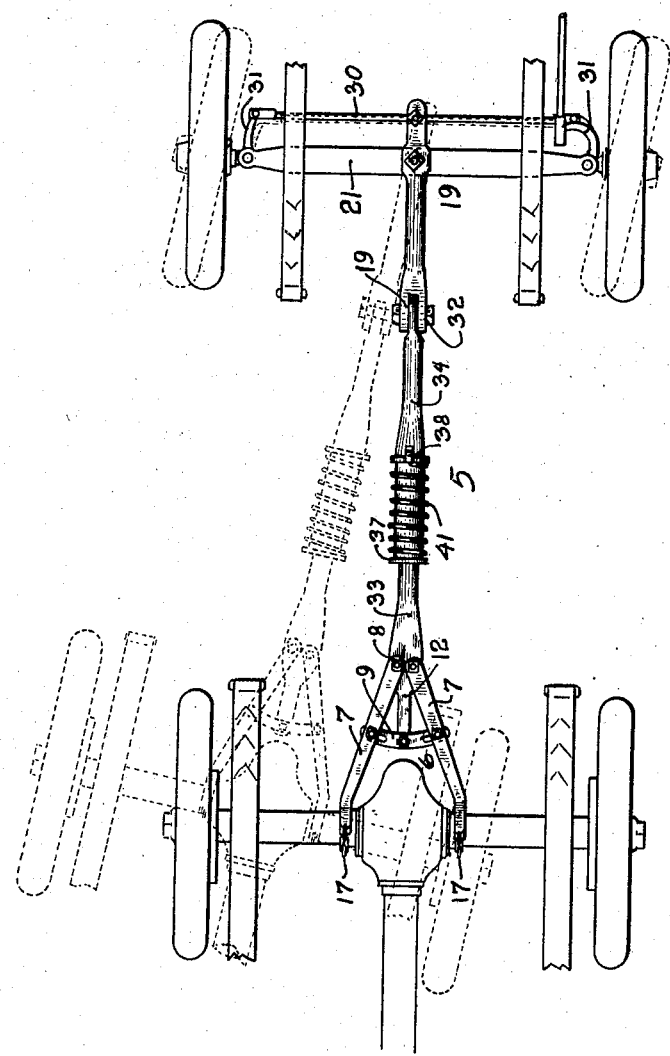
Fig. 4 is a top plan view of the rear part of the towing machine and the front part of the towed machine, the same being shown in two positions, one in full lines and the other in dotted lines.

Let the numeral 5 designate my improved draw bar considered in its entirety and consisting of a front part 6 composed of two arms 7 pivotally connected with the body of the bar as shown at 8. Between their extremities the arms 7 are connected with a cross piece 9 by means of set bolts 10 which are fitted in openings formed in the arms 7 and pass through slots formed in the cross piece 9 so that the arms 7 may be moved on their pivots 8 so that their extremities which engage the rear axle of the towing machine may be properly spaced to engage the housing on opposite sides of the differential of machines of somewhat different construction. Furthermore, by removing the set bolts or screws 10, the arms 7 may be folded back against the body of the bar thus reducing the device to small compass when it is not in use and making it exceedingly easy to carry it about. The transverse part 9 is secured to the forward extremity 12 of the body of the draw bar. The forward extremities of the arms 7 are vertically elongated as shown at 13, a part 14 extending above the horizontal part of the arm and a part 15 below the same part of the arm. This vertical elongated end of each arm is preferably provided with a facing 16 of leather or any other suitable material to prevent the marring of the housing of the towing machine since it must closely engage the latter. Connected with the lower extremity of the part 15 of each of these arms is a chain 17 which is also preferably faced with some suitable material as leather, to prevent injury to the housing. Each of these chains is fast around the housing of the towing machine and connected with the upper extremity of the part 14 which is slotted as shown at 18 to receive a link of the chain, thus securely connecting the forward end of the device to the towing machine.

The rear portion of the draw bar has pivotally connected therewith, as shown at 19, a U-bolt 20 which engages the front axle 21 of the machine to be towed and is secured thereon by a cross piece 22 located below the axle and secured by nuts 23. In order to insure that the U-bolt is tightly connected with the axle 21, a set bolt 24 may be employed. In the rear of the U-bolt a clamp 25 is connected with the draw bar by a bolt 26 which passes through a slot 47 so that the clamp may move longitudinally of the bar and also so that the bar may turn freely on the bolt as may be required. This clamp is composed of a top cross piece 27 and a part 28 connected with the cross piece by bolts 29, the central portion of the part 28 being depressed to engage the tie bar or rod 30 which connects the cranks 31 of the machine to be towed, so that as the towing machine changes its position as indicated by dotted lines in Fig. 4, the front wheels of the towed machine will be correspondingly shifted in order to properly follow the towing machine.

The draw bar is further provided with a joint 32, the parts of which are movable on a horizontal axis as circumstances may require. Further, the draw bar is composed of two main parts 33 and 34, the forward portion 35 of the part 34 being hollow to receive the rear portion 36 of the part 33, the two parts being thus connected in telescopic relation, the hollow part 35 having a collar 37 and the rear end of the part 36 carrying a key 38 which passes through slots 39 formed in the part 35, this key also engaging a washer 40 between which and the collar or flange 37 a spiral spring 41 is located. This construction allows the draw bar to yield longitudinally and is a particularly valuable feature since it makes the work of starting the machine to be towed much easier as the start is gradual.

From the foregoing description the use and operation of my improved towing draw bar will be readily understood. Assuming that the opposite extremities of the bar are respectively connected with the towing machine and with the machine to be towed as heretofore described, as the towing machine starts, the draw bar will be extended somewhat longitudinally by virtue of the construction heretofore described, thus starting the machine to be towed. Again assuming that the forward ends of the draw bar are secured tightly to the housing of the towing machine to prevent any movement thereon, the joint 32 will prove a valuable feature as it allows the two machines to occupy different levels as the two parts of the bar in the front and rear of the joint 32 may form any desired angles with each other that may be required, when the parts of the joint move with relation to a horizontal axis.

I claim:

A draw bar for towing automobiles, comprising a spring held longitudinal yieldable body member having a bifurcated forward portion, the extremities of the two arms of this portion extending both above and below the body member and shaped to engage the housing of the towing machine, flexible devices cooperating with the said arm extremities to connect the draw bar with the towing machine, the two arms being pivoted to the body member, and a cross piece mounted on the body member and with which the said arms are connected and on which they are adjustable to regulate the spacing of their forward extremities.

In testimony whereof I affix my signature.

SAMUEL W. SNYDER.